United States Patent
Bueche, Jr.

(10) Patent No.: US 10,572,949 B1
(45) Date of Patent: *Feb. 25, 2020

(54) SYSTEMS AND METHODS FOR PROVIDING A PERSISTENT STATE

(71) Applicant: United Services Automobile Association (USAA), San Antonio, TX (US)

(72) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/876,965

(22) Filed: Jan. 22, 2018

Related U.S. Application Data

(63) Continuation of application No. 14/681,458, filed on Apr. 8, 2015, now Pat. No. 9,911,158, which is a continuation of application No. 12/903,622, filed on Oct. 13, 2010, now Pat. No. 9,009,786.

(51) Int. Cl.
*G06Q 40/08* (2012.01)
*G06Q 10/10* (2012.01)

(52) U.S. Cl.
CPC ............. *G06Q 40/08* (2013.01); *G06Q 10/10* (2013.01)

(58) Field of Classification Search
CPC ................................ G06Q 40/08; G06Q 10/10
See application file for complete search history.

(56) References Cited

U.S. PATENT DOCUMENTS

| | | |
|---|---|---|
| 6,934,755 B1 | 8/2005 | Saulpaugh et al. |
| 7,188,176 B1 | 3/2007 | Nedderman et al. |
| 7,600,252 B2 | 6/2009 | Illowsky et al. |
| 2002/0073210 A1 | 6/2002 | Low et al. |
| 2003/0083906 A1 | 5/2003 | Howell et al. |
| 2003/0088676 A1 | 5/2003 | Smith et al. |
| 2005/0066037 A1 | 3/2005 | Song et al. |
| 2006/0146767 A1 | 7/2006 | Moganti |
| 2009/0138609 A1 | 5/2009 | Anderson et al. |
| 2009/0276771 A1 | 5/2009 | Nickolov et al. |
| 2011/0112866 A1* | 5/2011 | Gerrans .............. G06Q 30/02 705/3 |

(Continued)

OTHER PUBLICATIONS

"Seamless Mobile Computing on Fixed Infrastructure" [Retrieved on Apr. 1, 2010], Retrieved from the internet <http://www.intel-research.net/Publications/Pillsburgh/102920031215_ 172.pdf>. 10 pgs.

(Continued)

*Primary Examiner* — Nirav G Patel
(74) *Attorney, Agent, or Firm* — Fish & Richardson P.C.

(57) ABSTRACT

Systems and methods for providing persistent state are described herein. One or more embodiments include verifying access information provided by a user of a first device in connection with a user initiated transaction session, maintaining a current state of the transaction session in a persistent store, establishing a session key corresponding to the transaction session, providing the session key to the user, and providing the user access to the current state of the transaction session via a second device in response to validation of the session key received from the second device.

20 Claims, 4 Drawing Sheets

(56) References Cited

U.S. PATENT DOCUMENTS

2011/0286584 A1* 11/2011 Angel ............... H04M 3/42221
                                                            379/88.02
2013/0198807 A1*  8/2013 Herbach ............ G06F 21/6218
                                                            726/4
2019/0026269 A1*  1/2019 Spataro ................... G06F 16/93

OTHER PUBLICATIONS

"Portable Storage Support for Cyber Foraging" [Retrieved on Apr. 1, 2010], Retrieved from the internet <http://citeseerx.isl.psu.edu/viewdoc/download?doi=10.1.1.112.3043&rep=rep1 &type=pdf>. 7 pgs.

* cited by examiner

SYSTEMS AND METHODS FOR PROVIDING A PERSISTENT STATE

This application is a continuation application and claims priority under 35 U.S.C. § 120 to U.S. patent application Ser. No. 14/681,458, filed on Apr. 8, 2015, which is a continuation application of U.S. patent application Ser. No. 12/903,622, filed on Oct. 13, 2010, now U.S. Pat. No. 9,009,786, both of which are incorporated herein by reference in their entirety.

BACKGROUND

Today, individuals use several different types of devices to communicate including laptop and desktop computing devices, mobile devices (e.g., mobile phones, personal digital assistants, etc.), and landline telephones, among other communication devices. As such, a particular individual may have several different devices available which the individual can use to communicate with a particular person and/or entity (e.g., via various communication channels).

As an example, an individual may use a particular device to access a particular company's Internet website. The website may have an electronic document (e.g., an electronic form or application), that the individual desires to, or may be required to, complete.

The individual may have the option to print the document and complete it. However, the individual often has the option to electronically complete the document via their device (e.g., by completing various electronic fields within the document via their laptop, mobile phone, etc.).

In various instances, an electronic document can include several different portions to be completed and may require uploading document attachments such as image files, spreadsheets, etc., from the individual's device. When an individual initiates the process of completing an electronic document via a first particular user device, the individual may not be capable of switching to a different user device prior to completion of the process, without losing information provided via the first user device (e.g., the individual may have to start the completion process over).

DETAILED DESCRIPTION

Figure 1:
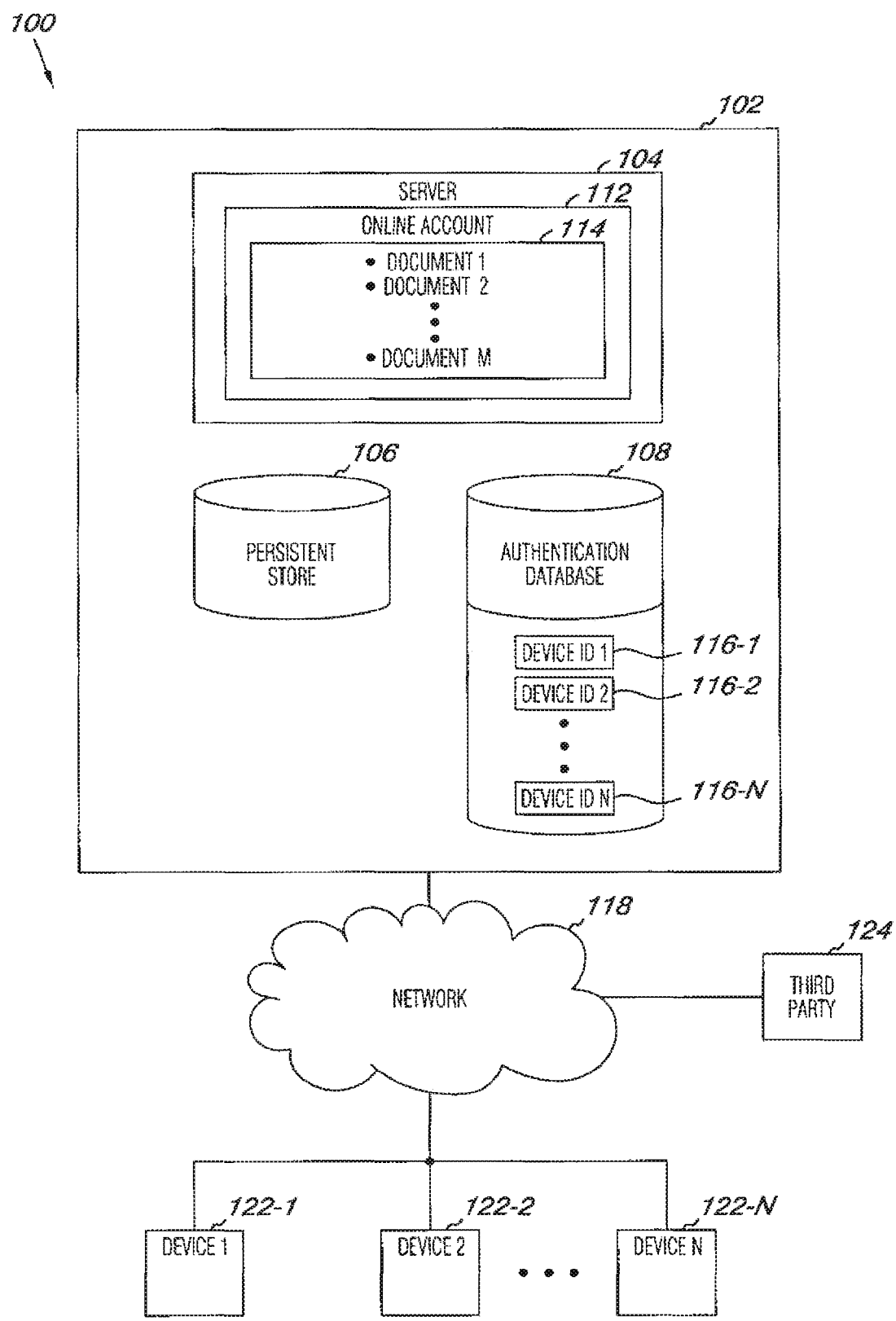
FIG. 1 illustrates a system for providing a persistent state according to one or more embodiments of the present disclosure.

The present disclosure describes systems and methods for providing a persistent state. One or more embodiments include verifying access information provided by a user of a first device in connection with a user initiated transaction session, maintaining a current state of the transaction session in a persistent store, establishing a session key corresponding to the transaction session, providing the session key to the user, and providing the user access to the current state of the transaction session via a second device in response to validation of the session key received from the second device.

Various embodiments of the present disclosure can create a persistent state in a particular communication channel, which can be instantiated in a subsequent communication channel. As such, embodiments can allow an individual to initiate a process via a first user device, switch to a different user device, and continue the process via the different user device without restarting the particular process.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 illustrates a system 100 for providing a persistent state according to one or more embodiments of the present disclosure. The system 100 includes a computing subsystem 102. The computing subsystem 102 can be a local area network (LAN), personal area network (PAN), campus area network (CAN), or metropolitan area network (MAN), which can communicate via one or more protocols over a wide area network (WAN) such as network 118 (e.g., the Internet).

As used herein, a "network" can provide a communication system that directly or indirectly links two or more computers and/or peripheral devices and allows users to access resources on other computing devices and exchange messages with other users. A network allows users to share resources on their own systems with other network users and to access information on centrally located systems or on systems that are located at remote locations.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network 118.

In the example illustrated in FIG. 1, the computing subsystem 102 is coupled to (e.g., in communication with) a number of devices 122-1 (DEVICE 1), 122-2 (DEVICE 2), . . . , 122-N (DEVICE N) associated with a particular user via network 118 (e.g., the Internet). The designator "N" is used herein to indicate a user can have a number of devices associated therewith.

As an example, the devices 122-1, 122-2, ..., 122-N can include one or more mobile devices (e.g., mobile phones, PDAs, etc.), laptop and/or desktop computers, and/or landline telephones, among other communication devices associated with a particular user. Although not shown in FIG. 1, one or more of the devices 122-1, 122-2, ..., 122-N can be connected to subsystem 102 via the public switched telephone network (PSTN).

In the example illustrated in FIG. 1, the computing subsystem 102 includes a server 104, a persistent store 106 and an authentication database 108. The subsystem 102 can be a computing subsystem of a particular entity such as a financial institution, for instance.

In this example, the financial institution may maintain online accounts for its members (e.g., customers). As such, a member can access his/her online account (e.g., 112) and can perform various transaction sessions with the financial institution via one or more of his/her user devices (e.g., 122-1, 122-2, ..., 122-N) through network 118, for instance.

In one or more embodiments, a member can access the online account 112 via a website associated with subsystem 102. In some embodiments, the website may be a secure website having a number of security features. For example, to access online account 112, a user of the website may have to be a member of the website or other organization and the member may be prompted to provide access information such as a username, password, and/or other access information associated with the user, which can be verified by subsystem 102.

The user can provide the access information via a particular user device 122-1, 122-2, ..., 122-N. Upon verification of the access information by subsystem 102, the user can be allowed to initiate transaction sessions.

For instance, the user may be able to initiate a process of completing one or more electronic documents 114 (e.g., shown as "DOCUMENT 1, DOCUMENT 2, ..., DOCUMENT M) available via online account 112. That is, a transaction session can include a process of altering a state of an electronic document. The online documents 114 can be of various types including, but not limited to, loan applications, accident report forms, and/or insurance applications, which a user can complete via a user device such as 122-1, 122-2, ..., 122-N.

In various embodiments, and as described further herein, the subsystem 102 is configured to maintain a current state of a transaction session in persistent store 106. That is, the current state of an instance (e.g., a running process) can be stored in persistent store 106 and can subsequently be instantiated based on data corresponding to current state of the instance stored in persistent store 106.

For instance, if a user has initiated (e.g., via a first user device such as device 122-1) a transaction session that includes the process of completing an electronic document, a current state of the process can be maintained in persistent store 106. As such, if the user switches to a second user device (e.g., a different user device such as 122-2, the type of device may be the same, but the physical device is different) prior to completion of process, the current state of the process can be instantiated on the second user device such that the user can continue the process of completing the electronic document from the current state without having to restart the document completion process.

As described further below, in various embodiments, a user is allowed access to the current state of a transaction session in response to verification of authentication information corresponding to, and received from, one of a number of different user devices (e.g., 122-1, 122-2, ..., 122-N) and verification of validation information corresponding to the transaction session received from one of the number of different devices (e.g., 122-1, 122-2, ..., 122-N). For instance, in the example provided above, subsystem 102 would allow the member access to the current state of the electronic document completion process stored in persistent store 106 upon verifying authentication information, such as a device identification number corresponding to the second user device (e.g., 122-2 in this example), and upon validating information, such as a session key, corresponding to the particular transaction session.

The authentication database 108 can include authentication information corresponding to the number of user devices 122-1, 122-2, ..., 122-N. In the example shown in FIG. 1, the authentication database includes device identification (ID) information 116-1 (DEVICE ID 1), 116-2 (DEVICE ID 2), and 116-N (DEVICE ID N) corresponding to the user devices 122-1, 122-2, ..., 122-N.

The computing subsystem 102 is also coupled to a third party device 124 via the network 118. The third party device 124 can be a user device associated with a medical professional, for example.

In various embodiments, a third party such as a doctor, can access a current state of a particular process that is maintained in persistent store 106. For instance, a user of one of the user devices 122-1, 122-2, ..., 122-N may initiate a transaction session in association with a process of completing an electronic document (e.g., 114).

A third party may be allowed to access a current state of the electronic document 114 (e.g., an insurance application) via third party device 124 in order to provide information to further the document completion process. As one example, if the electronic document 114 is an insurance application, a doctor may use third party device 124 to provide information and/or materials used to complete the application process.

The system 100 illustrated in FIG. 1 is one example of a computing system capable of implementing processes described herein. Computer executable instructions can be executed by one or more processors of one or more of the devices 104, 106, 108, 122-1, 122-2, ..., 122-N, and/or 124 to implement embodiments of the present disclosure.

Embodiments are not limited to the particular system 100 illustrated in FIG. 1. Aspects of one or more embodiments may be implemented in the general context of computer-executable instructions, such as program modules (e.g., routines, processes, objects, components, data structures, etc. that perform particular tasks or implement particular abstract data types).

Aspects of the embodiments may also be practiced in distributed computing environments where tasks are performed by remote processing devices that are linked through a communications network. In a distributed computing environment, program modules may be located in both local and remote computer storage media including memory storage devices.

As one of ordinary skill in the art will appreciate, computing devices such as one or more of devices 104, 106, 108, 122-1, 122-2, ..., 122-N, and/or 124 can include a variety of computer readable storage media. Computer readable media can be various available media that can be accessed and can include both volatile and nonvolatile media, as well as removable and non-removable media. Computer readable storage media can include random access memory (RAM), read-only memory (ROM), Electrically Erasable Programmable Read-Only Memory (EEPROM), Flash memory, CD-ROM, digital versatile disks (DVD) or other optical disk storage, magnetic cassettes, magnetic tape, magnetic disk storage or other magnetic storage devices, and/or other storage media accessible by a computing device.

Figure 2:
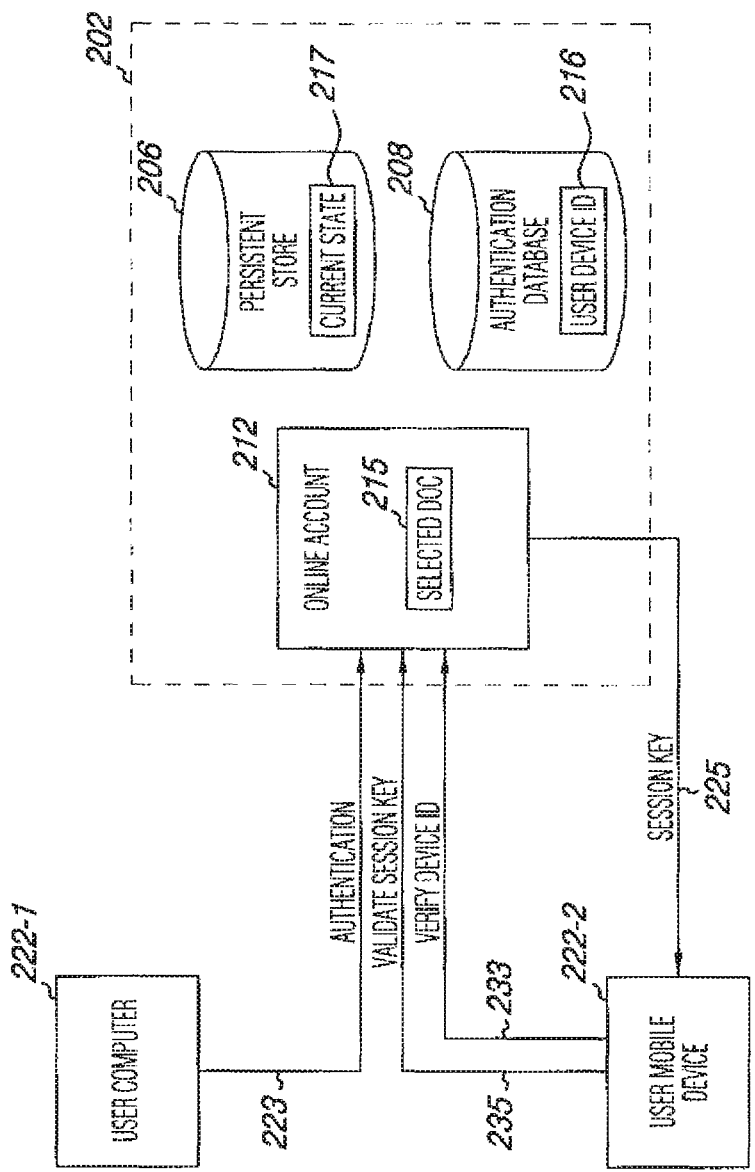
FIG. 2 illustrates a system for providing a persistent state according to one or more embodiments of the present disclosure.

FIG. 2 illustrates a system for providing a persistent state according to one or more embodiments of the present disclosure. The system illustrated in FIG. 2 can be a system such as system 100 described above in connection with FIG. 1 and can, for example, be used to implement one or more methods in accordance with embodiments described herein. The system shown in FIG. 2 includes a computing subsystem 202. The subsystem 202 can be a LAN, PAN, CAN, MAN, or other system which can communicate via one or more protocols over a WAN (e.g., network shown in FIG. 1).

The subsystem 202 can be associated with a particular organization, such as a financial institution, and can include online accounts, which can be accessed by particular members via user devices such as mobile phones, laptop computing devices, and/or other user devices. In various embodiments, and as illustrated in the example shown in FIG. 2, a member can access online account 212 via a first user device 222-1.

In this example, the user device 222-1 is a computer of the member (e.g., a laptop or desktop computer). The first user device 222-1 can access the online account via a network, such as network 118 described in FIG. 1.

However, embodiments are not limited to this example. For instance, in one or more embodiments, a user can access online account 212 via an interactive voice response (IVR) system (e.g., by using a landline or mobile telephone).

Arrow 223 indicates authentication by the subsystem 202 of access information provided by the member via computer 222-1. Authentication of the access information can include verifying information associated with the member and/or the online account.

The access information can, for example, include login information such as a username, password, personal identification number (PIN), social security number (SSN), and/or other information that can be used to authenticate the identity of the member and/or device 222-1 attempting to access the online account 212.

As discussed in connection with FIG. 1, the online account 212 can include a number of electronic documents (e.g., 114), which the member can select in order to complete in connection with a transaction session. In the example illustrated in FIG. 2, the member has selected a particular electronic document 215.

The member can then begin completing the selected document 215 via the computer 222-1 (e.g., by filling in various data fields corresponding to the selected document 215). As an example, the selected document 215 can be an insurance policy application, loan application, or accident report form, among various other document types.

In various instances, a member may desire to suspend the process of completing the selected document 215 using the first device 222-1 and to continue the completion process using a different user device, without having to start the process over again. For example, assume the electronic document 215 is an automobile accident report form and that the process of completing the form includes uploading image files showing vehicle damage.

In this example, the member may begin completing the form 215 using his/her computer 222-1. In some cases, the member may not yet have suitable image files to include in the report form, or the appropriate image files may not be available via the computer 222-1 (e.g., the image files are stored on a separate user device). In previous approaches, the member would likely have to discontinue the process of completing the accident report form and later restart the completion process, in which case the information previously provided by the member would be lost.

However, embodiments of the present disclosure allow the member to switch user devices during the completion process. That is, the member can start the completion process on a first user device and can subsequently resume the process (e.g., at the position in the process where they left off) using a different user device, without losing information previously provided by the member.

For instance, the member may decide to switch user devices prior to completion of the accident report form. As an example, the member may desire to use his/her mobile device 222-2 (e.g., a handheld phone with image taking capability) to take pictures showing vehicle damage to upload to the report form 215 as part of the completion process.

In one or more embodiments, the subsystem 202 maintains a current state 217 of the document completion process in the persistent store 206. The current state 217 can be the state of the completion process at a point when the member switches from the first device 222-1 to the second device 222-2 (e.g., the current state 217 can be an incomplete state of the electronic document completion process).

In various embodiments, the subsystem 202 can generate session identifier information such as a session key 225 corresponding to the particular transaction session in which the member is completing the selected document 215. As indicated by arrow 231, the session key 225 can be provided to the second user device 222-2. As an example, the session key 225 can be provided to the device 222-2 via a push notification from subsystem 202.

The subsystem 202 is configured to provide the member access to the current state 217 of the transaction session (e.g., the process of completing the selected document 215) via the second device 222-2 in response to validation 235 of the session key 225 received from the second device 222-2. In various embodiments, and as indicated by arrow 233 in FIG. 2, the subsystem 202 may verify particular identification information (e.g., a device ID number) corresponding to the second device 222-2 as a condition of providing the second device 222-2 access to the current state 217.

The subsystem 202 can verify the device ID of the second device 222-2 by comparing the device ID to a list of device IDs 216 stored in authentication database 208. As such, the member using the device 222-2 can access the current state 217 of the completion process associated with the selected document 215 in response to validation of the session key 225 and verification of the device ID associated with the second device 222-2. That is, the current state 217 of the process maintained in persistent store 206 is a persistent state that can be instantiated in a subsequent communication channel (e.g., using second device 222-2).

Embodiments are not limited to the example illustrated in FIG. 2. For example, in one or more embodiments, a third party user may be provided with the session key 225 and can access the current state 217 of the completion process via a user device of the third party.

The third party user may be a party such as a doctor, who may be allowed access to the completion process of the selected document 215 (e.g., an insurance application) in order to provide information such as medical information, which may be personal, sensitive, and/or privileged information. The session key 225 can be provided by the third party device and validated by the subsystem 202 as described above.

Also, in some embodiments, the third party device used to access the current state 217 of the selected document 215 can be verified in a similar manner to that described above in connection with verification of the second user device 222-2. For example, a device identifier associated with the third party device may be provided by the third party via the third party device, and the device identifier can be verified by subsystem 202 (e.g., by comparing the device identifier to a list of approved devices IDs stored in authentication database 208) or a key can be provided to the user and/or third party to allow the third party access.

Figure 3:
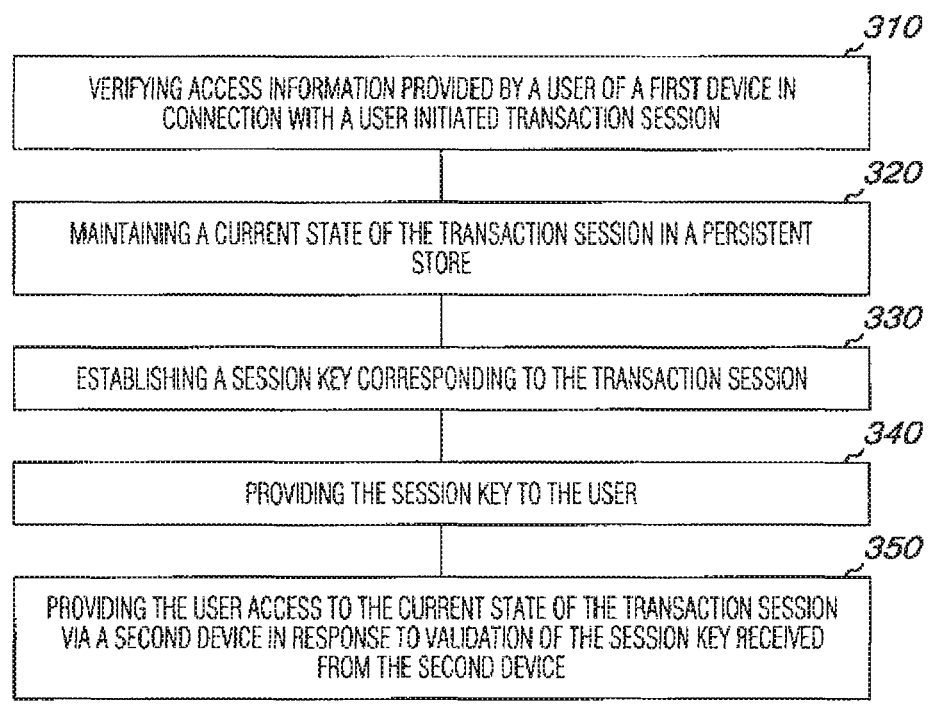
FIG. 3 illustrates a method for providing a persistent state according to one or more embodiments of the present disclosure.

FIG. 3 illustrates a method for providing a persistent state according to one or more embodiments of the present disclosure. At block 310, the method illustrated in FIG. 3 includes verifying access information provided by a user of a first device in connection with a user initiated transaction session.

The transaction session can be an electronic document completion process, for instance. In some embodiments, the transaction session can be conducted between the user and an entity such as a financial institution (e.g., between one or more user devices and a computing subsystem associated with the financial institution).

At block 320, the method includes maintaining a current state of the transaction session in a persistent store. The current state of the transaction session can be a state of a running process, such as an electronic document completion process.

At block 330, the method includes establishing a session key corresponding to the transaction session. The session key can be used to gain access to the current transaction session (e.g., the current state of the running process).

For example, as shown at block 340, the method includes providing the session key to the user. The user can then provide the session key to the computing subsystem of the financial institution.

As illustrated at block 350, the user can then be provided access to the current state of the transaction session via a second device (e.g., a device different from the first user device) in response to validation of the session key received from the second device.

Figure 4:
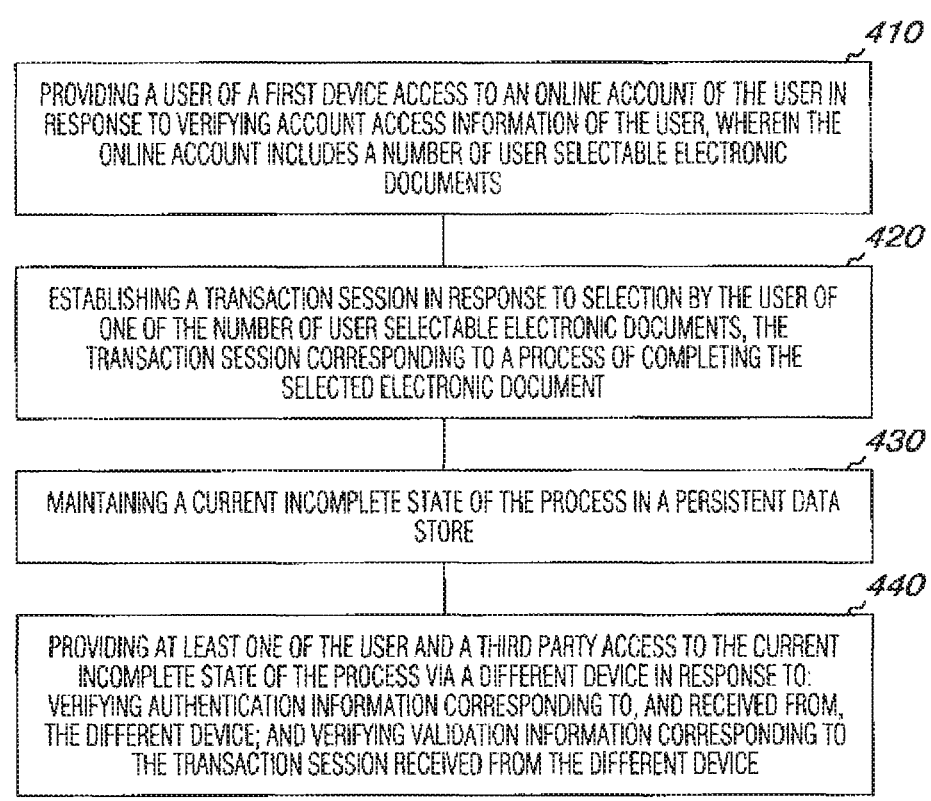
FIG. 4 illustrates a method for providing a persistent state according to one or more embodiments of the present disclosure.

FIG. 4 illustrates a method for providing a persistent state according to one or more embodiments of the present disclosure. At block 410, the method illustrated in FIG. 4 includes providing a user of a first device access to an online account of the user in response to verifying account access information of the user.

In some such embodiments, the online account includes a number of user selectable electronic documents. The user can be a member of an organization with which the member has an online account. The user selectable electronic documents can include, for example, insurance policy applications, loan applications, and/or report forms, among various other electronic document types.

At block 420, the method includes establishing a transaction session in response to selection by the user of one of the number of user selectable electronic documents, the transaction session corresponding to a process of completing the selected electronic document. At block 430, the method includes maintaining a current incomplete state of the process in a persistent data store. At block 440, the method includes providing at least one of the user and a third party access to the current incomplete state of the process via a different device in response to: verifying authentication information corresponding to, and received from, the different device; and verifying validation information corresponding to the transaction session received from the different device.

Embodiments of the present disclosure can provide various benefits including, but not limited to, creating a persistent state in a particular communication channel, which can be instantiated in a subsequent communication channel. As such, embodiments can allow an individual to initiate a process via a first user device, switch to a different user device, and continue the process via the different user device without restarting the particular process. In various embodiments, a current persistent state can subsequently be maintained allowing the individual to switch back to the first user device or a third user device to further continue the process without restarting the particular process.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for providing a persistent state, the system comprising:
   an authentication database comprising authentication information corresponding to each of a first device of a user and a third party device of a third party;
   a persistent store coupled to the authentication database; and
   a subsystem coupled to the persistent store, deployed in a memory, and executed by at least one processor to perform operations comprising:
      maintaining a current state of a transaction session in the persistent store, the transaction session being initiated by the first device of the user;
      providing, over a computer network, to the third party device of the third party, a session identifier identifying the transaction session;
      receiving, from the third party device over the computer network, (i) a third party device identifier associated with the third party device and (ii) the session identifier;

determining that the third party device identifier matches one of approved device identifiers stored in the authentication database; and providing, over the computer network, the third party with subsequent access to the current state of the transaction session via the third party device in response to validation of the session identifier received from the third party device.

2. The system of claim 1, wherein the current state of the transaction session is an incomplete state of an electronic document completion process.

3. The system of claim 1, wherein the first device is a desktop computer, a laptop computer, or a mobile phone.

4. The system of claim 1, wherein the session identifier is provided to the third party device of the third party via a push notification from the subsystem.

5. A computer-implemented method for providing a persistent state, the method comprising:
maintaining, by a computing system, a current state of a transaction session in a persistent store, the transaction session being initiated by a first device of a user;
providing, by the computing system over a computer network, to a third party device of a third party, a session identifier identifying the transaction session;
receiving, by the computing system, from the third party device over the computer network, (i) a third party device identifier associated with the third party device and (ii) the session identifier;
determining that the third party device identifier matches one of approved device identifiers stored in an authentication database; and
providing, by the computing system over the computer network, the third party with subsequent access to the current state of the transaction session via the third party device in response to validation of the session identifier received from the third party device.

6. The method of claim 5, wherein the current state of the transaction session is an incomplete state of an electronic document completion process.

7. The method of claim 5, wherein the transaction session corresponds to completion of an electronic document associated with an insurance transaction.

8. The method of claim 5, wherein the third party is a third party medical professional.

9. The method of claim 5, wherein the user is a member of an institution and wherein the transaction session is initiated via an online account the member has with the institution.

10. The method of claim 5, further comprising:
providing, by the computing system over the computer network, the session identifier to a second device of the user;
receiving, by the computing system over the computer network, a device identifier associated with the second device and the session identifier;
providing, by the computing system over the computer network, the user with access to the current state of the transaction session via the second device in response to validation of the device identifier associated with the second device and validation of the session identifier received from the second device.

11. The method of claim 10, wherein the second device has image capturing capability to capture an image to complete a form associated with the transaction session.

12. The method of claim 5, further comprising:
maintaining a subsequent current state of the transaction session in the persistent store; and
providing the user with access to the subsequent current state of the transaction session via the first device.

13. A non-transitory computer-readable medium coupled to at least one computer having instructions stored thereon which, when executed by the at least one computer, cause the at least one computer to perform operations for providing a persistent state, the operations comprising:
maintaining a current state of a transaction session in a persistent store, the transaction session being initiated by a first device of a user;
providing, over a computer network, to a third party device of a third party, a session identifier identifying the transaction session;
receiving, from the third party device over the computer network, (i) a third party device identifier associated with the third party device and (ii) the session identifier;
determining that the third party device identifier matches one of approved device identifiers stored in an authentication database; and
providing, over the computer network, the third party with subsequent access to the current state of the transaction session via the third party device in response to validation of the session identifier received from the third party device.

14. The non-transitory computer-readable medium of claim 13, wherein the current state of the transaction session is an incomplete state of an electronic document completion process.

15. The non-transitory computer-readable medium of claim 13, wherein the transaction session corresponds to completion of an electronic document associated with an insurance transaction.

16. The non-transitory computer-readable medium of claim 13, wherein the third party is a third party medical professional.

17. The non-transitory computer-readable medium of claim 13, wherein the user is a member of an institution and wherein the transaction session is initiated via an online account the member has with the institution.

18. The non-transitory computer-readable medium of claim 13, wherein the operations further comprise:
providing, over the computer network, the session identifier to a second device of the user;
receiving, over the computer network, a device identifier associated with the second device and the session identifier;
providing, over the computer network, the user with access to the current state of the transaction session via the second device in response to validation of the device identifier associated with the second device and validation of the session identifier received from the second device.

19. The non-transitory computer-readable medium of claim 18, wherein the second device has image capturing capability to capture an image to complete the transaction session.

20. The non-transitory computer-readable medium of claim 13, further comprising:
maintaining a subsequent current state of the transaction session in the persistent store; and
providing the user with access to the subsequent current state of the transaction session via the first device in response to validation of the session identifier received from the first device.

* * * * *